US012611713B2

(12) United States Patent
Li et al.

(10) Patent No.: US 12,611,713 B2
(45) Date of Patent: Apr. 28, 2026

(54) NON-DESTRUCTIVE TESTING METHOD FOR CRACK DEFECTS, AND A TESTING STANDARD PART AND A MANUFACTURING METHOD THEREOF

(71) Applicants: AECC SHANGHAI COMMERCIAL AIRCRAFT ENGINE MANUFACTURING CO., LTD., Shanghai (CN); AECC COMMERCIAL AIRCRAFT ENGINE CO., LTD., Shanghai (CN)

(72) Inventors: Yali Li, Shanghai (CN); Liming Lei, Shanghai (CN); Xiaohui Chen, Shanghai (CN); Jun Fu, Shanghai (CN); Fei Chang, Shanghai (CN)

(73) Assignees: AECC SHANGHAI COMMERCIAL AIRCRAFT ENGINE MANUFACTURING CO., LTD., Shanghai (CN); AECC COMMERCIAL AIRCRAFT ENGINE CO., LTD., Shanghai (CN)

( * ) Notice: Subject to any disclaimer, the term of this patent is extended or adjusted under 35 U.S.C. 154(b) by 636 days.

(21) Appl. No.: 17/920,557

(22) PCT Filed: Dec. 28, 2020

(86) PCT No.: PCT/CN2020/139981
§ 371 (c)(1),
(2) Date: Oct. 21, 2022

(87) PCT Pub. No.: WO2021/212893
PCT Pub. Date: Oct. 28, 2021

(65) Prior Publication Data
US 2023/0150028 A1 May 18, 2023

(30) Foreign Application Priority Data
Apr. 22, 2020 (CN) ......................... 202010319649.5

(51) Int. Cl.
*B22F 10/28* (2021.01)
*B22F 10/38* (2021.01)
(Continued)

(52) U.S. Cl.
CPC .............. *B22F 10/28* (2021.01); *B22F 10/38* (2021.01); *B22F 12/90* (2021.01); *B23K 31/125* (2013.01);
(Continued)

(58) Field of Classification Search
CPC .......... B22F 10/28; B22F 10/38; B22F 12/90; B22F 10/366; B22F 10/80; B22F 10/00;
(Continued)

(56) References Cited

U.S. PATENT DOCUMENTS

2016/0355904 A1 12/2016 Achuthan et al.

FOREIGN PATENT DOCUMENTS

| CN | 103084573 A | 5/2013 |
| CN | 106881462 A | 6/2017 |

(Continued)

OTHER PUBLICATIONS

Neil J. Harrison, "Reduction of micro-cracking in nickel superalloys processed by Selective Laser Melting: A fundamental alloy design approach", Acta Materialia, vol. 94, Aug. 2015, pp. 59-68 (Year: 2015).*

(Continued)

*Primary Examiner* — Catherine T. Rastovski
*Assistant Examiner* — Yossef Korang-Beheshti
(74) *Attorney, Agent, or Firm* — Maier & Maier, PLLC

(57) ABSTRACT
A non-destructive testing method for crack defects, and a testing standard part and a manufacturing method thereof, used for the non-destructive testing of crack defects of an additive manufacturing workpiece. The manufacturing method of the crack defect standard part comprises: step A,
(Continued)

Step A
setting a crack defect area of the standard part, in the crack defect area, a proportion of the crack defects in the crack defect area is set as a first proportion value Step B
selecting an additive manufacturing forming process for manufacturing the crack defect area to obtain a first process parameter of the additive manufacturing forming process corresponding to the first proportion value Step C
performing the additive manufacturing forming process based on the first process parameter to form the crack defect area setting a crack defect area of the standard part, in the crack defect area, the proportion of the crack defects in the crack defect area is set as a first proportion value; step B, selecting an additive manufacturing forming process for manufacturing the crack defect area to obtain a first process parameter of the additive manufacturing forming process corresponding to the first proportion value; and step C, performing the additive manufacturing forming process based on the first process parameter to form the crack defect area. The non-destructive testing method for crack defects of the present invention has the advantages of accurate and reliable testing results.

8 Claims, 6 Drawing Sheets

(51) Int. Cl.

| | |
|---|---|
| *B22F 12/90* | (2021.01) |
| *B23K 26/342* | (2014.01) |
| *B23K 31/12* | (2006.01) |
| *B33Y 10/00* | (2015.01) |
| *B33Y 50/00* | (2015.01) |
| *G01N 23/04* | (2018.01) |
| *G01N 23/083* | (2018.01) |
| *G01N 23/18* | (2018.01) |

(52) U.S. Cl.
CPC .............. *B33Y 50/00* (2014.12); *G01N 23/04* (2013.01); *G01N 23/083* (2013.01); *G01N 23/18* (2013.01); *B23K 26/342* (2015.10); *B33Y 10/00* (2014.12); *G01N 2223/04* (2013.01); *G01N 2223/615* (2013.01)

(58) Field of Classification Search
CPC .... B23K 31/125; B23K 26/342; B33Y 50/00; B33Y 50/02; B33Y 40/00; G01N 23/04; G01N 23/083; G01N 23/18; G01N 2223/04; G01N 2223/615; G01N 1/28; G01N 1/44; G01N 2203/027; G01N 2203/0298; G01N 2203/0641; C22C 1/0433; Y02P 10/25

See application file for complete search history.

(56) References Cited

FOREIGN PATENT DOCUMENTS

| | | |
|---|---|---|
| CN | 108195856 A | 6/2018 |
| CN | 108436081 A | 8/2018 |
| CN | 108941560 A | 12/2018 |
| CN | 109080134 A | 12/2018 |
| CN | 110414873 A | 11/2019 |
| CN | 111207985 A | 5/2020 |

OTHER PUBLICATIONS

Dacian Tomus, "Effect of minor alloying elements on crack-formation characteristics of Hastelloy-X manufactured by selective laser melting", Additive Manufacturing, vol. 16, Aug. 2017, pp. 65-72 (Year: 2017).*

International Search Report mailed Mar. 25, 2021, in corresponding to International Application No. PCT/CN2020/139981; 8 pages (with English Translation).

Extended European Search Report and Opinion issued on Apr. 19, 2024, in corresponding European Application No. 20932126.4, 11 pages.

Harrison et al., "Reduction of Micro-Cracking in Nickel Superalloys Processed by Selective Laser Melting: A Fundamental Alloy Design Approach", ScienceDirect, Acta Materialia Inc., Elsevier Ltd., May 16, 2015, vol. 94, 10 pages.

Tomus et al., "Effect of Minor Alloying Elements on Crack-Formation Characteristics of Hastelloy-X Manufactured by Selective Laser Melting", ScienceDirect, Additive Manufacturing, Elsevier B.V., May 9, 2017, vol. 16, 8 pages.

Search Report issued May 29, 2020, in corresponding Chinese Application No. 202010319649.5, 5 pages (with Partial English Translation).

Search Report issued Jun. 18, 2020, in corresponding Chinese Application No. 202010319649.5, 3 pages (with Partial English Translation).

Huipeng et al., "Microstructural Evolution and tensile Property of Hastelloy-X Alloys Produced by Selective Laser Melting", Chinese Journal of Lasers, vol. 44, No. 2, Feb. 2017, DOI: 10.3788/CJL201744.0202007, 6 pages (with English Abstract).

Duan et al., "Selective laser melting fabrication and cracking behavior of Rene104 nickel-based superalloy", The Chinese Journal of Nonferrous Metals, vol. 28, No. 8, Aug. 2018, DOI: 10.19476/j.ysxb.1004.0609.2018.08.10, pp. 1568-1578 (with English Abstract).

* cited by examiner

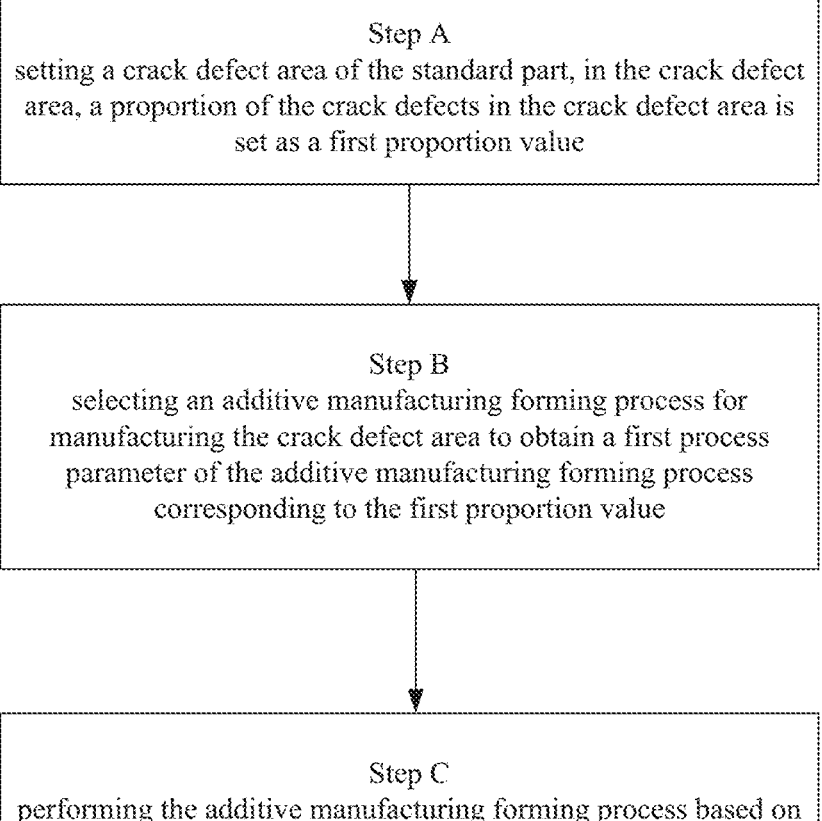

Step A
setting a crack defect area of the standard part, in the crack defect
area, a proportion of the crack defects in the crack defect area is
set as a first proportion value Step B
selecting an additive manufacturing forming process for
manufacturing the crack defect area to obtain a first process
parameter of the additive manufacturing forming process
corresponding to the first proportion value Step C
performing the additive manufacturing forming process based on
the first process parameter to form the crack defect area

Fig. 1

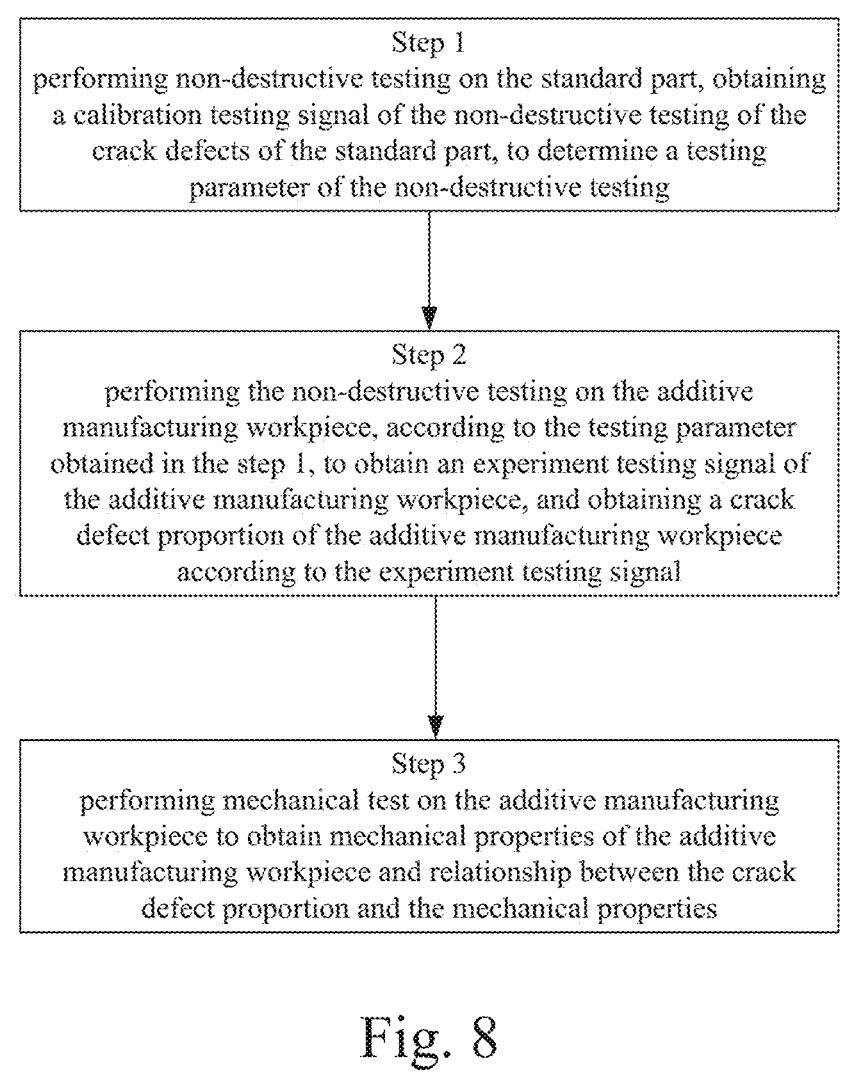

Step 1
performing non-destructive testing on the standard part, obtaining a calibration testing signal of the non-destructive testing of the crack defects of the standard part, to determine a testing parameter of the non-destructive testing Step 2
performing the non-destructive testing on the additive manufacturing workpiece, according to the testing parameter obtained in the step 1, to obtain an experiment testing signal of the additive manufacturing workpiece, and obtaining a crack defect proportion of the additive manufacturing workpiece according to the experiment testing signal Step 3
performing mechanical test on the additive manufacturing workpiece to obtain mechanical properties of the additive manufacturing workpiece and relationship between the crack defect proportion and the mechanical properties

Fig. 8

NON-DESTRUCTIVE TESTING METHOD FOR CRACK DEFECTS, AND A TESTING STANDARD PART AND A MANUFACTURING METHOD THEREOF

TECHNICAL FIELD

The present invention relates to the field of processing quality testing of workpieces, in particular to a testing method for cracks in an additive manufacturing workpiece, and a testing standard part and a manufacturing method thereof.

BACKGROUND

Additive manufacturing (AM) technology is commonly known as 3D printing and three dimension printing technology. At present, metal additive manufacturing technology is gradually mature and has been widely used in aerospace, medical treatment, automobile, nuclear power and other fields. For example, selective laser melting (SLM) is considered to be one of the most potential AM technologies. Because laser beam with fine focusing spot is used as forming energy source, high-speed and high-precision scanning galvanometer is used as processing beam control unit, and thinner layer thickness control technology is used, compared with other AM technologies, SLM technology has advantages in obtaining high-density and high-precision formed parts, can complete direct forming of complex cavity, surface, thin wall and variable cross-section parts, and is widely used in aerospace and other fields, such as aero-engine pre-rotating nozzle, fuel nozzle, turbine blade and other parts.

Due to the complex phase transformation process of rapid melting and solidification of metal powder materials in SLM process, SLM components are prone to crack defects. The principle is that in the process of laser selective melting and forming, uneven temperature field caused by local heat input will inevitably cause local thermal effect, so the molten pool will bear the role of tensile stress during solidification and subsequent cooling, and form residual stress in subsequent process, which eventually leads to the generation of cracks.

In present, non-destructive testing (NDT) methods (such as industrial CT testing, ultrasonic testing, radiographic testing, fluorescent penetrant testing, etc.) are widely used to test the crack position and crack defect proportion of parts in SLM components for Aerospace, so as to analyze and evaluate whether the parts meet the service requirements. The general steps of traditional NDT methods are manufacturing a standard part with crack defects, calibrating the standard part to obtain a calibration testing signal corresponding to the crack defects; or directly consulting a table and fitting to obtain the calibration testing signal corresponding to the defects; performing NDT on the workpiece to obtain an experiment testing signal of the workpiece; and comparing the experiment testing signal with the calibration testing signal to obtain the crack defect condition of the workpiece, including features such as crack position and crack defect proportion.

However, the inventor found that because the structural parts manufactured by additive material have different microstructure and defect features from traditional parts, such as non-uniformity, anisotropy and complex geometry, problems such as poor accessibility and large testing blind area will occur in traditional NDT process. Therefore, the corresponding relationship between the crack defects of traditional parts and the calibration testing signal of NDT cannot be simply used. A recalibrate is necessary to clarify the NDT signal features of crack defects of the additive manufacturing workpiece, and determine the NDT parameters that can obtain clear NDT signals.

In the prior art, there are mainly three methods for manufacturing a testing standard part for crack testing. The first method is to conduct a fatigue test by using fatigue testing machine to manufacture crack defects with a certain size. The second method is to cut a crack with plasma or other high-energy beam, and then weld it.

However, the inventor found that the manufacturing process for manufacturing the standard part with crack defects of these two methods, will damage the structure of the standard part to a great extent, and the crack shape thereof is quite different from that produced by the additive manufacturing process. In addition, due to the damage of structure, the mechanical testing of the standard part cannot be further performed to evaluate the effect of the crack on mechanical property of the standard part.

In the prior art, there is also a method for manufacturing standard part by additive manufacturing, such as laser selective melting (SLM). In model design stage of the additive manufacturing, the shape of crack defects is designed in the standard part, that is, the crack is obtained through the structural design method, in order to obtain a standard part having the structure with similar crack to that generated in the additive manufacturing structuring process, for getting a more accurate calibration result. For example, in the Chinese patent application document with Publication No. CN108436081A, the length of crack defects is designed to be 8 mm in advance, the required crack defect size, location and other information are added to a sample model to form a three-dimensional model with defects, and then the three-dimensional model is printed.

However, the inventor found that in the model design stage, the crack structure is designed to obtain the three-dimensional model, and the standard part is obtained by additive manufacturing according to the three-dimensional model, wherein the crack with large width is easy to leave powder with a diameter of tens of microns in the crack gap, the crack with small width is easy to be filled by metal with molten boundary profile, and the crack cannot be formed. Therefore, it is difficult to obtain a standard part with crack defects consistent with the three-dimensional model, and can not truly reflect the crack defects of additive manufacturing.

Therefore, there is a need in the art for a testing method for testing cracks of an additive manufacturing workpiece, a testing standard part and a manufacturing method thereof, so as to realize accurate NDT of crack defects of the additive manufacturing workpiece, and further test the relationship between the crack defects of the additive manufacturing workpiece and the mechanical property thereof.

SUMMARY

The purpose of the present invention is to provide a testing method for cracks in an additive manufacturing workpiece, and a testing standard part and a manufacturing method thereof, so as to realize the accurate non-destructive testing of crack defects in the workpiece manufactured by additive material.

According to one aspect of the present invention, a manufacturing method of a crack defect standard part, used for the non-destructive testing of crack defects of an additive manufacturing workpiece, comprising: step A, setting a crack defect area of the standard part, in the crack defect area, a proportion of the crack defects in the crack defect area is set as a first proportion value; step B, selecting an additive manufacturing forming process for manufacturing the crack defect area to obtain a first process parameter of the additive manufacturing forming process corresponding to the first proportion value; and step C, performing the additive manufacturing forming process based on the first process parameter to form the crack defect area.

In one or more embodiments of the manufacturing method, in the step B, the additive manufacturing forming process is a laser selective melting forming process, and the first process parameter comprises a first laser linear energy density. The higher the set first proportion value, the higher the correspondingly set first laser linear energy density.

In one or more embodiments of the manufacturing method, the material of the crack defect area is Hastelloy X alloy. The first proportion value is 0.07%-1.2%. The first process parameter comprises: a first laser linear energy density of 230 J/m-400 J/m, a first scanning spacing of 0.07 mm-0.09 mm, a first strip width of 3 mm-10 mm, a first strip overlap of 0.05 mm-0.1 mm, and a first paving powder thickness of 0.02 mm-0.03 mm. The first laser linear energy density is determined by the following formula:

$$a=1.3-1.4/(1+(\eta/291)^8)$$

wherein a is the first proportion value, and $\eta$ is the first laser linear energy density.

In one or more embodiments of the manufacturing method, in the step B, the first proportion value is 1.2%, the first laser linear energy density is 400 J/m, the first scanning spacing is 0.07 mm, the first strip width is 3 mm, the first strip overlap is 0.1 mm, and the first paving powder thickness is 0.03 mm; or, in the step B, the first proportion value is 0.07%, the first laser linear energy density is 230 J/m, the first scanning spacing is 0.09 mm, the first strip width is 10 mm, the first strip overlap is 0.05 mm, and the first paving powder thickness is 0.03 mm; or, in the step B, the first proportion value is 0.43%, the first laser linear energy density is 277 J/m, the first scanning spacing is 0.08 mm, the first strip width is 5 mm, the first strip overlap is 0.07 mm, and the first paving powder thickness is 0.03 mm.

In one or more embodiments of the manufacturing method, the step A further comprises: setting a body area of the standard part, and the body area is free of crack defects. The step B further comprises: selecting another additive manufacturing forming process for manufacturing the body area to obtain a second process parameter of the another additive manufacturing forming process corresponding to the body area. The step C further comprises: performing the another additive manufacturing forming process based on the second process parameter to form the body area.

In one or more embodiments of the manufacturing method, in the step B, the another additive manufacturing forming process is a laser selective melting forming process, the material in the body area is Hastelloy X alloy, and the second process parameter of the another additive manufacturing forming process comprises: a second laser linear energy density of 170 J/m-200 J/m, a second scanning spacing of 0.08 mm-0.10 mm, a second strip width of 4 mm-6 mm, a second strip overlap of 0.06 mm-0.1 mm, and a second paving powder thickness of 0.02 mm-0.03 mm.

A crack defect standard part according to another aspect of the present invention is manufactured by the manufacturing method described in any one of the above.

According to another aspect of the present invention, a non-destructive testing method for crack defects, used for testing crack defects of an additive manufacturing workpiece, comprises: step 1, performing non-destructive testing on the above-mentioned standard part, obtaining a calibration testing signal of the non-destructive testing of crack defects of the standard part, to determine a testing parameter of the non-destructive testing; and step 2, performing the non-destructive testing on the additive manufacturing workpiece, according to the testing parameter obtained in the step 1, to obtain an experiment testing signal of the additive manufacturing workpiece, and obtaining a crack defect proportion of the additive manufacturing workpiece according to the experiment testing signal.

In one or more embodiments of the non-destructive testing method, a step 3, performing mechanical test on the additive manufacturing workpiece to obtain mechanical property of the additive manufacturing workpiece and relationship between the crack defect proportion and the mechanical property, is also comprised.

In one or more embodiments of the non-destructive testing method, the step 1 comprises: manufacturing the above-mentioned standard part; and performing the non-destructive testing to obtain the calibration testing signal of the non-destructive testing of crack defects of the standard part to determine the testing parameter of the non-destructive testing.

Summary, the progressive effects of the present invention comprise obtaining the detection standard part with cracks through the adjustment of process parameters, for more truly reflecting the crack defects of the additive manufacturing workpiece, and obtaining more accurate calibration results and NDT parameters, so as to improve the accuracy and reliability of the NDT results of crack defects of the additive manufacturing workpiece, and further obtain a more accurate and reliable relationship between the crack defects of the additive manufacturing workpiece and the mechanical properties of the additive manufacturing workpiece.

BRIEF DESCRIPTION OF THE DRAWINGS

The specific features and performance of the present invention are further given by the following embodiments and accompanying drawings.

FIG. 1 is a flowchart of the manufacturing method of the testing standard part for cracks of the additive manufacturing workpiece according to one or more embodiments.

FIG. 8 is a flowchart of the method for testing cracks of the additive manufacturing workpiece according to one or more embodiments.

DETAILED DESCRIPTION OF EMBODIMENTS

A variety of different embodiments or examples for implementing the subject technical proposal are disclosed below. In order to simplify the disclosure, specific examples of each element and arrangement are described below. Certainly, these are only examples and do not limit the protection scope of the present invention. "One embodiment", "an embodiment", and/or "some embodiments" mean a feature, structure or characteristic related to at least one embodiment of the present application. Therefore, it should be emphasized and noted that "an embodiment" or "one embodiment" or "an alternative embodiment" mentioned twice or more in different positions in this specification do not necessarily refer to the same embodiment. In addition, some features, structures or characteristics in one or more embodiments of the present application may be combined appropriately.

A flowchart is used in the present application to illustrate the operation performed by the system according to an embodiment of the present application. It should be understood that the preceding or following operations are not necessarily performed accurately in order. Other operations can also be added into these processes, alternatively, one or more steps of operations can also be removed from these processes.

As shown in FIG. 1, in an embodiment, the manufacturing method of the testing standard part for testing cracks of the additive manufacturing workpiece comprises:

step A, setting a crack defect area of the standard part, in the crack defect area, a proportion of the crack defects in the crack defect area is set as a first proportion value.

Figure 2:
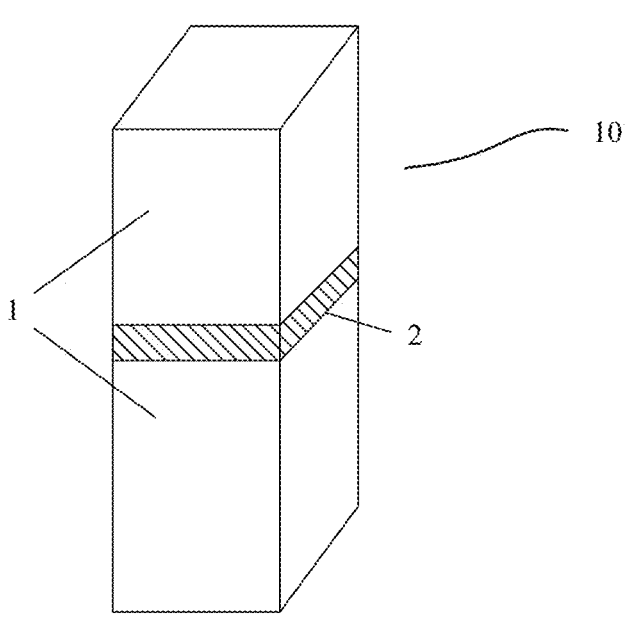
FIG. 2 is a structural diagram of the standard part according to one or more embodiments.

Specifically, the process of setting the crack defect area can be realized by Unigraphics (UG) and other computer-aided design software. Referring to FIG. 2, the specific structure of the standard part 10 can be that the standard part 10 comprises a body area 1 and a crack defect area 2, and the body area 1 is free of crack defects. However, it is not limited to this. The crack defect area 2 may not be limited to one crack defect area 2 shown in FIG. 2, but may be a plurality of crack defect areas. An example of a limit is that in order to calibrate the possible case that the whole workpiece has cracks, the standard part 10 is set to have only the crack defect area 2. The area proportion of the crack defects to the crack defect area 2 is the first proportion value, and the first proportion value is set according to the needs of the data points to be calibrated. In one or more embodiments of standard part 10 with a plurality of crack defect areas 2, the plurality of crack defect areas 2 may have different first proportion values, which can accelerate the calibration process to realize the simultaneous calibration of the calibration testing signals corresponding to different crack defect proportions.

step B, selecting an additive manufacturing forming process for manufacturing the crack defect area to obtain a first process parameter of the additive manufacturing forming process corresponding to the first proportion value; and step C, performing the additive manufacturing forming process based on the first process parameter to form the crack defect area.

Figure 3:
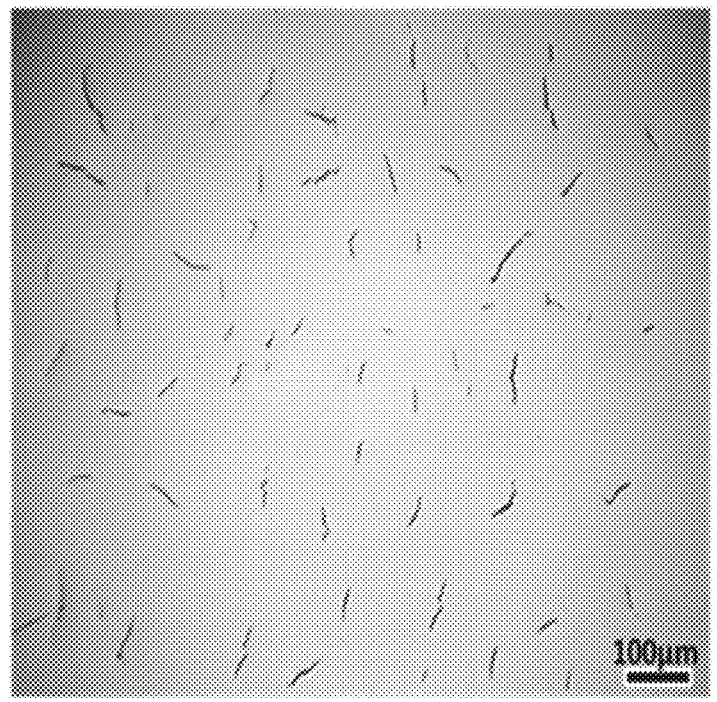
FIG. 3 is an optical microscope photograph of crack defects with the first proportion value according to an embodiment.

Specifically, in an embodiment for example, the first proportion value is set to 1.2%, the additive manufacturing process is selected as the laser selective melting forming process, the EOS M280 laser selective melting forming equipment is adopted, the forming material is Hastelloy X alloy, and the corresponding first process parameters are: the first laser linear energy density is 400 J/m, the first scanning spacing is 0.07 mm, the first strip width is 3 mm, the first strip overlap is 0.1 mm, and the first paving powder thickness is 0.02 mm-0.03 mm, which is 0.03 mm in this embodiment. The obtained optical microscope photograph of the crack defect area is shown in FIG. 3.

Figure 4:
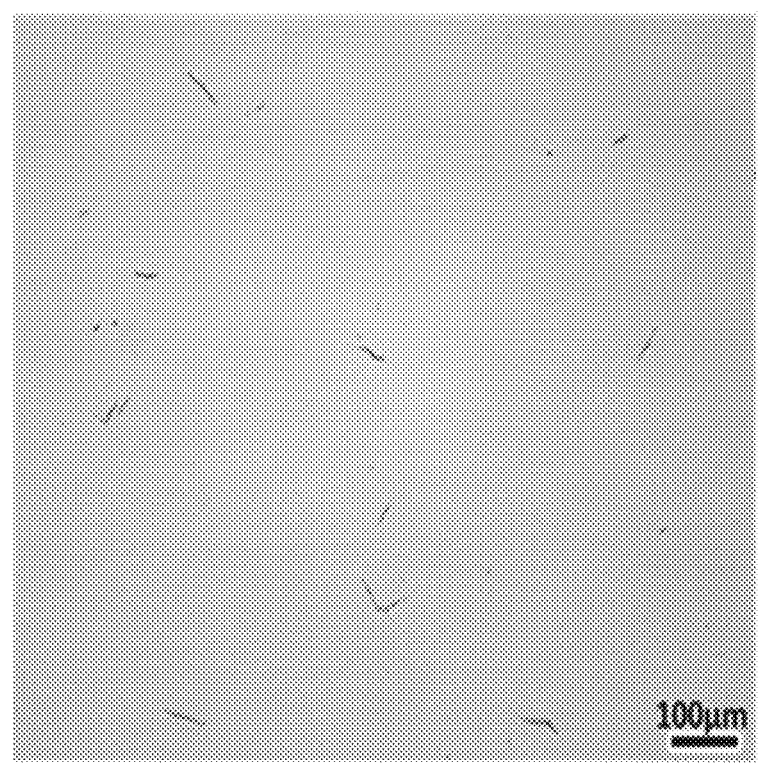
FIG. 4 is an optical microscope photograph of crack defects with the first proportion value according to another embodiment.

In another embodiment for example, the first proportion value is set to 0.07%, the additive manufacturing process is laser selective melting forming process, EOS M280 laser selective melting forming equipment is adopted, the forming material is Hastelloy X alloy, and the corresponding first process parameters are: the first laser linear energy density is 230 J/m, the first scanning spacing is 0.09 mm, the first strip width is 10 mm, the first strip overlap is 0.05 mm, and the first paving powder thickness is 0.02 mm-0.03 mm, which is 0.03 mm in this embodiment. The obtained optical microscope photograph of the crack defect area is shown in FIG. 4.

Figure 5:
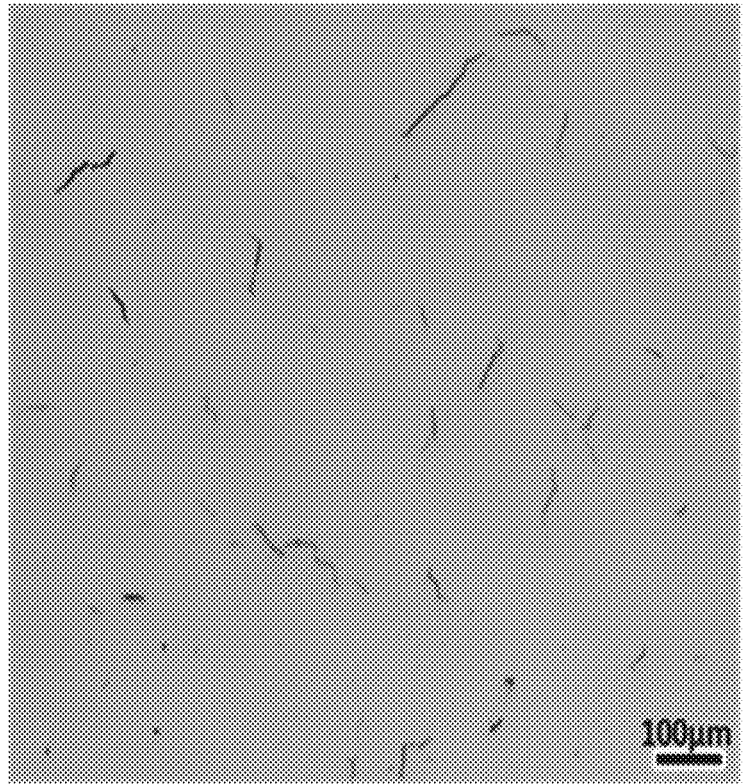
FIG. 5 is an optical microscope photograph of crack defects with the first proportion value according to another embodiment.

In another embodiment for example, the first proportion value is set to 0.43%, the additive manufacturing process is laser selective melting forming process, EOS M280 laser selective melting forming equipment is adopted, the forming material is Hastelloy X alloy, and the corresponding first process parameters are: the first laser linear energy density is 277 J/m, the first scanning spacing is 0.08 mm, the first strip width is 5 mm, the first strip overlap is 0.07 mm, and the first paving powder thickness is s 0.02 mm-0.03 mm, which is 0.03 mm in this embodiment. The obtained optical microscope photograph of the crack defect area is shown in FIG. 5.

The specific method of strip printing is well known to those skilled in the art. For example, the user manual of EOS M280 laser selective melting forming equipment can be referred to, alternatively, academic papers such as sun Z, Tan x, tor s B, et al. Selective laser melting of stainless steel 316L with low porosity and high build rates [J]Materials & design, 2016, 104: 197-204 can also be referred to, and other references will not be repeated here.

The first process parameters corresponding to the first proportion value can be obtained by test, or calculated by consulting literature and fitting simulation. Generally speaking, it is tested or calculated according to laser volume energy density. The volume energy density comprises the laser linear energy density, the thickness of powder layer, the overlapping width of strip and the scanning spacing. The greater the volume energy density, the easier it is to form cracks. The principle is that when the strip lap width is larger and the scanning spacing is smaller, the volume laser energy density is larger, resulting in larger temperature gradient, larger residual stress and more cracks.

However, in the study, the inventor accidentally found that for the first proportion value of 0.07%-1.2%, within the range of the first scanning spacing of 0.07 mm-0.09 mm, the width of the first strip of 3 mm-10 mm, the first strip overlap of 0.05 mm-0.1 mm, and the paving powder thickness of 0.02 mm-0.03 mm, the formation of crack defects is only related to the laser linear energy density, and can be quickly obtained by the formula:

$$a=1.3-1.4/(1+(\eta/291)^8)$$

wherein a is the first proportion value, and $\eta$ is the first laser linear energy density.

Figure 6:
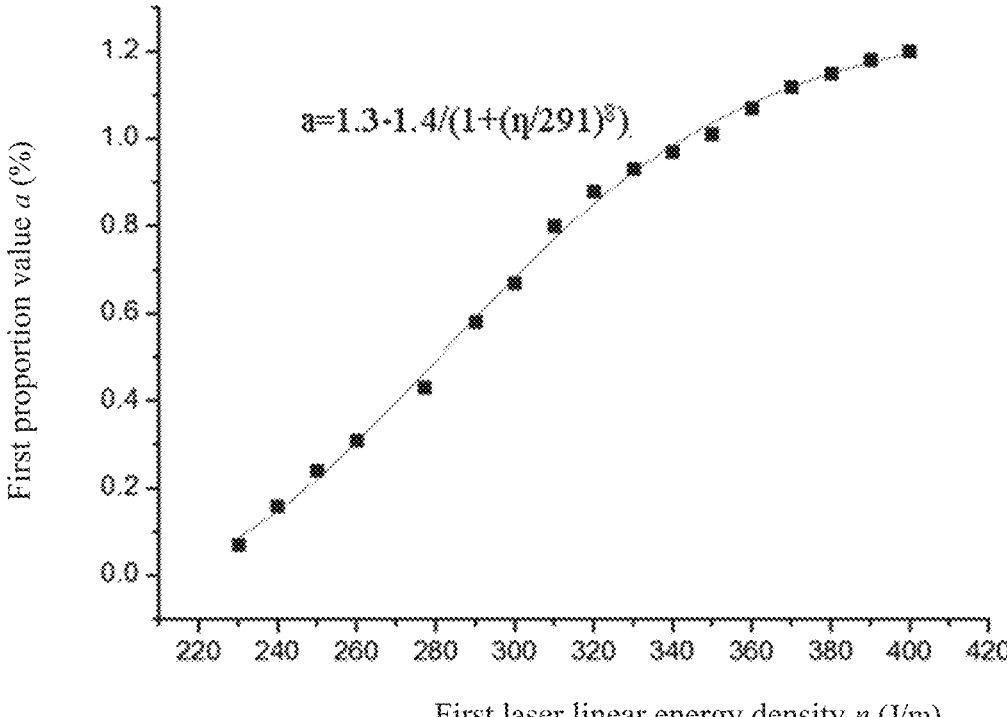
FIG. 6 is a graph of the laser linear energy density corresponding to the first proportion value.

As shown in FIG. 6, the actual values of the first proportion value and the first laser energy density are basically consistent with the formula. The specific actual values are shown in the table below:

TABLE 1

| actual values of the first proportion value and the first laser energy density | |
| --- | --- |
| Linear energy density (J/M) | First proportion value (%) |
| 230 | 0.07 |
| 240 | 0.16 |
| 250 | 0.24 |
| 260 | 0.31 |
| 277 | 0.43 |
| 290 | 0.58 |
| 300 | 0.67 |
| 310 | 0.8 |
| 320 | 0.88 |
| 330 | 0.93 |
| 340 | 0.97 |
| 350 | 1.01 |
| 360 | 1.07 |
| 370 | 1.12 |
| 380 | 1.15 |
| 390 | 1.18 |
| 400 | 1.20 |

Therefore, for the range of the first proportion value of 0.07%-1.2%, the corresponding first process parameters can be determined quickly and accurately through the formula to improve the manufacturing efficiency.

In addition, it can also be seen from FIG. 3 to FIG. 5 that there are only individual crack defects within the range of the first proportion value of 0.07%-1.2%, and other defect forms such as incomplete fusion defects will not be mixed. Therefore, the manufactured standard part can obtain more accurate testing parameters for testing crack defects.

Those skilled in the art can understand that the additive manufacturing process in the above embodiment is a laser selective melting forming process, which is not limited to this. Any workpiece with additive manufacturing process that may produce crack defects can be applicable. Additionally, the material is not limited to Hastelloy X alloy, but also other materials. The Hastelloy X alloy used here is widely used in high-density and high-precision formed parts, and is widely used in aerospace and other fields, such as aero-engine pre-rotating nozzle, fuel nozzle, turbine blade and other parts. The beneficial effect of setting the range of the first proportion value to 0.07%-1.2% is also that according to the discovery of the inventor in long-term practice, the crack defect with the first proportion value of 0.07%-1.2% has the greatest impact on the high-density and high-precision formed parts formed by laser selective melting of Hastelloy X alloy. If the first proportion value is less than 0.07%, it can be similar to no crack defect and has limited impact on the performance of the workpiece. If the first proportion value is greater than 1.2%, the warpage of the forming surface is usually serious due to the excessive thermal stress. Therefore, there is no need to perform crack testing, and the formed part can be directly discarded and reprinted for manufacturing without subsequent impact. It can be understood that the above description shows that the standard parts manufactured by the method of this disclosure can accurately calibrate the calibration testing signal corresponding to the first proportion value of 0.07%-1.2%, so as to accurately test the crack defects of the workpiece with the proportion of crack defects of 0.07%-1.2%, which is especially suitable for non-destructive testing of high-density and high-precision formed parts formed by laser selective melting of Hastelloy X alloy. It can be understood that this disclosure is also applicable to other materials, other workpieces with additive manufacturing process that may produce crack defects. Additionally, the first proportion value is not limited to 0.07%-1.2%, but also other ranges.

Figure 7:
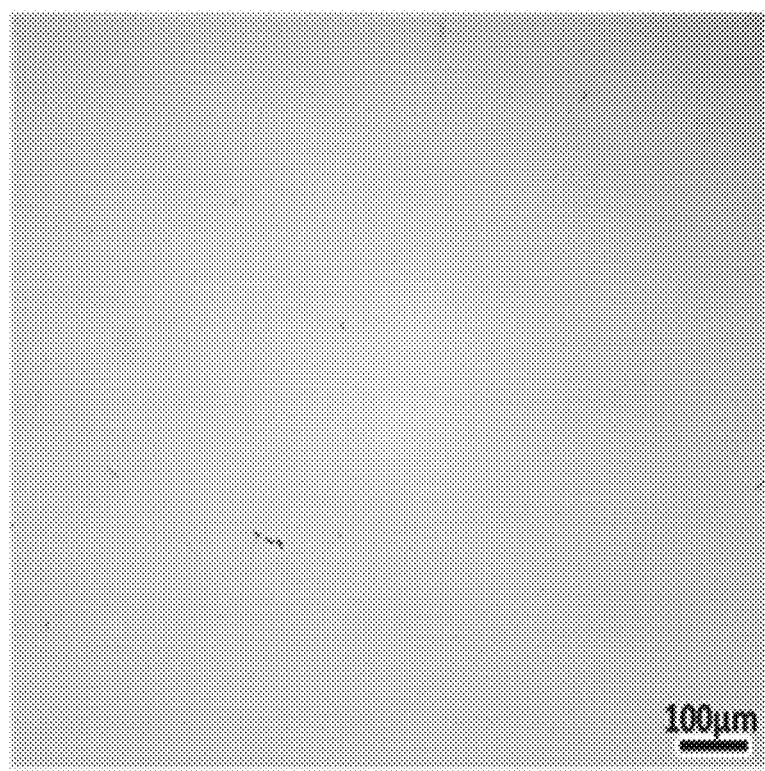
FIG. 7 is an optical microscope photograph of the body area of the standard part without crack defects according to one or more embodiments.

In some embodiments, for standard parts with the body area 1, the step B also comprises the additive manufacturing of the body area, which can be performed by another additive manufacturing process, whose process parameters are the second process parameters. In an embodiment, the other additive manufacturing and forming process is laser selective melting forming process, comprising that the material in the body area is Hastelloy X alloy and the second process parameters comprise: a second laser linear energy density of 170 J/m-200 J/m, a second scanning spacing of 0.08 mm-0.10 mm, a second strip width of 4 mm-6 mm, a second strip overlap of 0.06 mm-0.10 mm, and a second paving powder thickness of 0.02 mm-0.03 mm. In an embodiment, the second laser line energy density is 185 J/m, the second scanning spacing is 0.09 mm, the second strip width is 5 mm, the second strip overlap is 0.06 mm, and the second paving powder thickness is 0.03 mm. The optical microscope photograph of the obtained body area is shown in FIG. 7.

Referring to FIG. 8, in an embodiment, the non-destructive testing method for testing cracks of an additive manufacturing workpiece may comprise the following steps:

step 1, performing non-destructive testing on the standard part 10 manufactured by the above manufacturing method, obtaining a calibration testing signal of the non-destructive testing of crack defects of the standard part 10, and determining a testing parameter of the non-destructive testing that can clearly reflect the crack defects; and step 2, performing the non-destructive testing on the additive manufacturing workpiece, according to the testing parameter obtained in the step 1, to obtain an experiment testing signal of the additive manufacturing workpiece, and obtaining a crack defect proportion of the additive manufacturing workpiece according to the experiment testing signal.

Specifically, for example, for the non-destructive testing of industrial CT, non-destructive testing of the standard part 10 is performed first, and the testing parameters are debugged until the crack defects can be clearly reflected to obtain the non-destructive testing image of the standard part. In the step 2, non-destructive testing is performed to the additive manufacturing workpiece, according to the testing parameters of industrial CT obtained in step 1, to obtain an experiment testing image, and the proportion of crack defects in the workpiece manufactured by additive material is obtained according to the image. It can be understood that non-destructive testing can also be ultrasonic testing with similar steps. The testing signal is a waveform image, which needs to be fitted by comparing a calibration testing signal with an experiment testing signal. Compared with the ultrasound, the industrial CT is more intuitive, but the cost is also higher. Those skilled in the art can understand that the above steps can also be applied to other non-destructive testing methods, and are not limited by the industrial CT and ultrasonic testing.

In some embodiments, the specific steps of step 1 may be manufacturing the standard part, followed by performing non-destructive testing. In this way, the calculation results are more accurate and reliable. However, the specific steps are not limited to this. For example, batch processing and purchase of standard parts can be entrusted in advance, while the non-destructive testing can be performed when necessary.

Further, in some embodiments, the testing method also comprises a step 3, performing mechanical test on the additive manufacturing workpiece to obtain mechanical properties of the additive manufacturing workpiece and further obtain a relationship between the crack defect proportion and the mechanical properties. The mechanical test can be strength assessment tests such as elongation, durability and fatigue. In this way, the performance assessment results can actually analyze and study the relationship between crack defects and mechanical properties of workpieces, and provide strong theoretical support for the application of additive manufacturing forming workpieces, such as SLM forming workpieces.

Summary, the beneficial effects of adopting the manufacturing method of a standard part, the standard part and the testing method for crack defects, provided in the above embodiments, is that the testing standard part with cracks, obtained by adjusting process parameters, more truly reflects the crack defects of the additive manufacturing workpiece, and obtains more accurate calibration results and NDT parameters, so as to improve the accuracy and reliability of the NDT results of crack defects of the additive manufacturing workpiece, and further obtain a more accurate and reliable relationship between the crack defects of the additive manufacturing workpiece and the mechanical properties of the additive manufacturing workpiece.

Although the above embodiments of the present invention are disclosed as above, they are not used to limit the present invention. Any person skilled in the art can make possible changes and modifications without departing from the spirit and scope of the present invention. Therefore, any amendments, equivalent changes and modifications, made to the above embodiments according to the technical essence of the present invention without departing from the technical proposal of the present invention, will fall within the protection scope that is defined in the claims of the present invention.

The invention claimed is:

1. A manufacturing method of a crack defect standard part, used for the non-destructive testing of crack defects of an additive manufacturing workpiece, comprises:
    step A, setting a crack defect area of the standard part, wherein a proportion of the crack defects in the crack defect area is set as a first proportion value;
    step B, selecting an additive manufacturing forming process for manufacturing the crack defect area to obtain first process parameters of the additive manufacturing forming process corresponding to the first proportion value; and
    step C, performing the additive manufacturing forming process based on the first process parameters to form the crack defect area,
    wherein, the additive manufacturing forming process is a laser selective melting forming process, the material in the crack defect area is Hastelloy X alloy, the first proportion value is 0.07%-1.2%, the first process parameters comprise: a first laser linear energy density of computed from the first proportion value by a following formula, a first scanning spacing of 0.07 mm-0.09 mm, a first strip width of 3 mm-10 mm, a first strip overlap of 0.05 mm-0.1 mm, and a first paving powder thickness of 0.02 mm-0.03 mm; the first laser linear energy density is determined by the following formula:

$$a = 1.3 - 1.4/(1 + (\eta/291)^8)$$

wherein a is the first proportion value, and $\eta$ is the first laser linear energy density.

2. The manufacturing method of claim 1, wherein in the step B, the first proportion value is 1.2%, the first scanning spacing is 0.07 mm, the first strip width is 3 mm, the first strip overlap is 0.1 mm, and the first paving powder thickness is 0.03 mm; or
    in the step B, the first proportion value is 0.07%, the first scanning spacing is 0.09 mm, the first strip width is 10 mm, the first strip overlap is 0.05 mm, and the first paving powder thickness is 0.03 mm; or
    in the step B, the first proportion value is 0.43%, the first scanning spacing is 0.08 mm, the first strip width is 5 mm, the first strip overlap is 0.07 mm, and the first paving powder thickness is 0.03 mm.

3. The manufacturing method of claim 1, wherein the step A further comprises: setting a body area of the standard part, and the body area is free of crack defects; the step B further comprises: selecting another additive manufacturing forming process for manufacturing the body area to obtain a second process parameter of the another additive manufacturing forming process corresponding to the body area; the step C further comprises: performing the another additive manufacturing forming process based on the second process parameter to form the body area.

4. The manufacturing method of claim 3, wherein in the step B, the another additive manufacturing forming process is a laser selective melting forming process, the material in the body area is Hastelloy X alloy, and the second process parameter of the another additive manufacturing forming process comprises: a second laser linear energy density of 163 J/m-200 J/m, a second scanning spacing of 0.08 mm-0.10 mm, a second strip width of 4 mm-6 mm, a second strip overlap of 0.06 mm-0.1 mm, and a second paving powder thickness of 0.02 mm-0.03 mm.

5. A crack defect standard part, manufactured by the manufacturing method of claim 1.

6. A non-destructive testing method for crack defects, used for testing crack defects of an additive manufacturing workpiece, comprises:
    step 1, performing non-destructive testing on the standard part of claim 5, obtaining a calibration testing signal of the non-destructive testing of crack defects of the standard part, to determine a testing parameter of the non-destructive testing; and
    step 2, performing the non-destructive testing on the additive manufacturing workpiece, according to the testing parameter obtained in the step 1, to obtain an experiment testing signal of the additive manufacturing workpiece, and obtaining a crack defect proportion of the additive manufacturing workpiece according to the experiment testing signal.

7. The testing method of claim 6, further comprising:
    step 3, performing mechanical test on the additive manufacturing workpiece to obtain mechanical property of the additive manufacturing workpiece and relationship between the crack defect proportion and the mechanical property.

8. The testing method of claim 6, wherein the step 1 comprises:
    manufacturing the standard part; and
    performing the non-destructive testing to obtain the calibration testing signal of the non-destructive testing of crack defects of the standard part to determine the testing parameter of the non-destructive testing.

* * * * *